United States Patent
Berg et al.

(10) Patent No.: US 7,913,405 B2
(45) Date of Patent: Mar. 29, 2011

(54) TARGET FOR USE IN MEASURING AND SURVEYING APPLICATIONS

(75) Inventors: Ulf Berg, Stockholm (SE); Anneli Utterbäck, Rimbo (SE); Johan Carlèn, Vallentuna (SE)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 12/451,154

(22) PCT Filed: May 30, 2007

(86) PCT No.: PCT/EP2007/004769
§ 371 (c)(1), (2), (4) Date: Oct. 28, 2009

(87) PCT Pub. No.: WO2008/145156
PCT Pub. Date: Dec. 4, 2008

(65) Prior Publication Data
US 2010/0107429 A1    May 6, 2010

(51) Int. Cl.
*G01C 15/02* (2006.01)
(52) U.S. Cl. ............................... 33/293; 33/228
(58) Field of Classification Search .................. 33/228, 33/293, 294, 295, 296
See application file for complete search history.

(56) References Cited

U.S. PATENT DOCUMENTS

| | | | | |
|---|---|---|---|---|
| 4,820,041 A * | 4/1989 | Davidson et al. | | 33/293 |
| 4,879,815 A * | 11/1989 | Vischer | | 33/293 |
| 5,983,511 A * | 11/1999 | Osaragi et al. | | 33/293 |
| 6,665,067 B2 * | 12/2003 | Ogawa et al. | | 356/247 |
| 7,739,803 B2 * | 6/2010 | Yahagi et al. | | 33/293 |
| 2003/0051356 A1 * | 3/2003 | Jackson et al. | | 33/293 |
| 2004/0233415 A1 | 11/2004 | Nakamura et al. | | |
| 2006/0201007 A1 | 9/2006 | Piekutowski | | |
| 2010/0212169 A1 * | 8/2010 | Fleenor et al. | | 33/228 |

FOREIGN PATENT DOCUMENTS
WO     WO 95/34849      12/1995
WO     WO 2004/057269   7/2004

OTHER PUBLICATIONS
International Search Report.

* cited by examiner

*Primary Examiner* — G. Bradley Bennett
(74) *Attorney, Agent, or Firm* — Harness, Dickey & Pierce, P.L.C.

(57) ABSTRACT

One embodiment of the present invention concerns a target for use with a measuring instrument in distance measuring and surveying applications. The target includes a base element, at least one light reflecting area arranged at the base element, the at least one light reflecting area being arranged to reflect light beams being incident in an angular area of substantially 360° degrees in plane, and an identification unit arranged at the base element and being adapted to emit signals having predetermined characteristics, wherein the predetermined characteristics may be used to identify the target.

18 Claims, 3 Drawing Sheets

TARGET FOR USE IN MEASURING AND SURVEYING APPLICATIONS

FIELD OF THE INVENTION

The present invention generally relates to targets for use in distance measuring and surveying applications and more specifically to a reflective target for receiving light beams emitted from a survey instrument such as a distance measuring instrument and for reflecting them toward the survey instrument.

BACKGROUND

The art of surveying involves the determination of unknown positions, or setting out of known coordinates using angle and distance measurements taken from one or more positions. In order to make these measurements, a surveying device or instrument frequently used is a distance measuring instrument with an integrated distance and angular measurement of the type which is called a total station, i.e. with combined electronic, optical and computer techniques. A total station is furthermore provided with a computer or control unit with writable information for measurements to be performed and for storing data obtained during the measurements. Preferably, the total station calculates the position of a target in a fixed ground-based coordinate system. In, for example, WO 2004/057269 by the same applicant, such a total station is described in more detail.

When performing distance measuring or surveying tasks using a distance measuring total station at a work site, naval work site, a construction work site or a mining work site, it is often desirable to lock and track a certain target, for example, mounted on a ground preparing machine. Thereby, it is possible to perform tasks such as tracking the ground preparing machine or measuring the distance to the machine. The target or reflector unit may, for example, be mounted on the roof of the vehicle.

In the prior art, there are a number of different reflector or target constructions, for example, a corner cube prism. A corner cube prism reflects back an incident beam in the opposite direction even if the angle of incidence is relatively oblique. Furthermore, in U.S. Pat. No. 6,185,055 a 360-degree reflector is shown. The reflector includes triple prisms arranged such that they cover an angular area of 360° in a plane.

However, it is often desirable to ensure that the measuring instrument identifies and locks onto the correct target. This is of particular interest when operating at a work place with multiple targets or in highly reflective, difficult environments. Therefore, there is a need within the art for a target for use in distance measuring and surveying applications that is capable of receiving a light beam emitted from a measuring instrument and for reflecting it toward the measuring instrument in a reliable way at the same time as the measuring instrument is able to secure that reflected light was received from the correct target.

SUMMARY OF THE PRESENT INVENTION

Thus, an object of the present invention is to obtain a target that is capable of receiving a light beam emitted from a measuring instrument and for reflecting it toward the measuring instrument in a reliable way at the same time as it is capable of providing the measuring instrument with a target identification.

This and other objects of the present invention are achieved by means of a reflecting target having the features defined in the independent claims. Preferable embodiments of the invention are characterized by the dependent claims.

In order to clarify, the term "measurement instrument" used herein refers to a distance measuring instrument with an integrated distance and angular measurement, i.e. with combined electronic, optical and computer techniques. Such an instrument gives both the distance as well as the vertical and horizontal direction angle towards a target, whereby the distance is measured against an object or reflector.

According to an aspect of the present invention, there is provided a target for use in measuring and surveying applications. The target comprises a base element, at least one light reflecting area arranged at the base element, and an identification unit comprising at least one array of light emitting elements being adapted to emit signals having predetermined characteristics indicating an identity of said target and wherein the at least one light reflecting area and the at least one array of light emitting elements are arranged axial symmetrically at the base element. The at least one light reflecting area and the at least one array of light emitting elements are arranged axial symmetrically about a central axis of the base element, the central axis being vertical or longitudinal, i.e. substantially perpendicular in relation to a plane at which an array of light emitting devices may be arranged.

Thus, the present invention is based on the idea of combining a passive target element for distance measuring and tracking and an active target element for identification into one single target. The predetermined characteristics of the emitted signals is determined such that it can be used to determine an identity of a specific target. Due to this fact it is possible to use a number of targets in the same work area or site since the risk that an instrument locks onto the wrong target can be significantly reduced. Thereby, a target that enables a fast and reliable target recognition and tracking capability can be obtained. The active identification ensures that the measuring instrument identifies and locks onto the correct target. This is of a particular interest when operating at a work place in highly reflective, difficult environments and when a plurality of targets are used at a work place.

According to a further aspect of the present invention, there is provided a method for determining an identity of a target in a measuring and surveying system including at least one measuring instrument and at least one target, the target comprising: a base element; at least one light reflecting area arranged at the base element, the at least one light reflecting area being arranged to reflect light beams being incident in an angular area of substantially 360° degrees in plane; and an identification unit arranged at the base element. The method comprises: emitting signals having predetermined characteristics indicating an identify of the target from the identification unit; receiving the signals at the measuring unit; and determining an identity of the target in the measuring device using the predetermined characteristics of the received signals.

During a measuring or surveying operation, e.g. a measuring instrument may, upon receiving signals transmitted from the target at a detector, accept or reject the target depending on the characteristics of the detected signals. In other words, the instrument may determine an identity of the target based on the characteristics of the received signals. When an accepted target is detected, the instrument will lock onto the target and starts performing a surveying operation such as a distance measuring operation or a tracking operation.

In embodiments of the present invention, the target comprises two arrays of light emitting elements and one light reflecting area arranged axial symmetrically at the base element or one array of light emitting elements and two light reflecting area arranged axial symmetrically at the base element. In other embodiments, there may be, for example, five arrays with light emitting devices and two area with light emitting area, or vice versa, arranged in an axial symmetrically way.

According to another aspect of the present invention, there is provided a measuring and surveying system including at least one target according to the first aspect of the invention and at least one measuring instrument. The measuring instrument is adapted to emit light beams, to receive reflected light from said target, to detect signals emitted from target having predetermined characteristics identifying the target, and to determine an identity of the target by using the predetermined characteristics.

According to an embodiment of the present invention, the at least one light reflecting area is arranged to reflect light beams being incident in an angular area of substantially 360° degrees in plane.

In one embodiment of the present invention, the identification unit comprises at least one array of light emitting elements adapted to emit light having predetermined characteristics.

According to a further embodiment of the present invention, the at least one reflecting area and the at least one array of light emitting elements are circumferentially and rotational symmetrically arranged at the base element.

In a further embodiment of the present invention, the at least one light reflecting area and the array of light emitting elements are circumferentially and coaxially arranged at the base element. Thereby, it is ensured that the instrument always will have at least one reflecting area and at least one light emitting element in the same line of sight in respect of the measuring instrument.

According to further embodiments of the present invention, the signals includes a modulation of the signals with a predetermined frequency.

In a preferred embodiment, at least one array of light emitting element includes light emitting diodes.

Furthermore, the light emitting diodes may be infrared light emitting diodes modulated with a certain predetermined frequency.

In one embodiment, the at least one at least one array of light emitting elements are circumferentially arranged such that light beams can be emitted in an angular area of substantially 360° degrees in plane.

In an embodiment of the present invention, the at least one light reflecting area comprises a reflective foil applied on the base element.

In an alternative embodiment, the at least one light reflecting area comprises at least one reflecting prism.

In one embodiment of the present invention, the identification unit comprises a RF-unit including a transmitter adapted to transmit RF-signals modulated with a certain frequency, wherein a measuring instrument is capable of determining an identity of the target by means of received RF-signals.

According to the embodiments of the present invention, the rotational position of a target can be determined at a tracker unit, for example a robotic total station, by detecting light emitted from a plurality of emitters at the target, for example, the arrays of light emitting devices. The target emitters first emit an omni-directional synchronization signal. Following the synchronization signal, each of the emitters is activated one at a time or in groups sequentially, starting with a predetermined emitter. By detecting the emitted light at the tracker unit, and determining when the strongest signal (amplitude) from the target is detected, the time difference can be determined between the time of the synchronization signal and the time of the strongest signal from an individual emitter. From this information, the rotational position of the target (its reference direction) relative to a coordinate system known to the tracker unit can be calculated.

In a preferred embodiment, detected amplitudes from at least two emitters are used for determining the rotational position of the target. Using not only one, but two or more detected amplitudes provides for an improved accuracy when determining the target rotational position relative to the coordinate system. Improved rotational accuracy for the target is then obtained by interpolating between detected amplitudes for adjacent emitters.

Suitably, the synchronization signal may be coded (modulated) in order to indicate an identity of the target sending out the synchronization signal.

An active target for a target tracking system according to the present invention comprises a plurality of emitters, such as light emitting diodes, arranged circumferentially around the target; and control circuitry for activating the emitters in two successive phases, wherein the first phase includes emission of a synchronization signal and the second phase includes sequential activation of the emitters starting from a reference direction (a reference emitter). During the second phase, each emitter is activated for a predetermined time.

The features that characterize the invention, both as to organization and to method of operation, together with further objects and advantages thereof, will be better understood from the following description used in conjunction with the accompanying drawings. It is to be expressly understood that the drawings is for the purpose of illustration and description and is not intended as a definition of the limits of the invention. These and other objects attained, and advantages offered, by the present invention will become more fully apparent as the description that now follows is read in conjunction with the accompanying drawings.

BRIEF DESCRIPTION OF THE DRAWINGS

In the following detailed description, reference will be made to the accompanying drawings, of which.

DETAILED DESCRIPTION OF THE PRESENT INVENTION

In the following, description will be given on embodiments of the present invention referring to the attached drawings.

Figure 1:
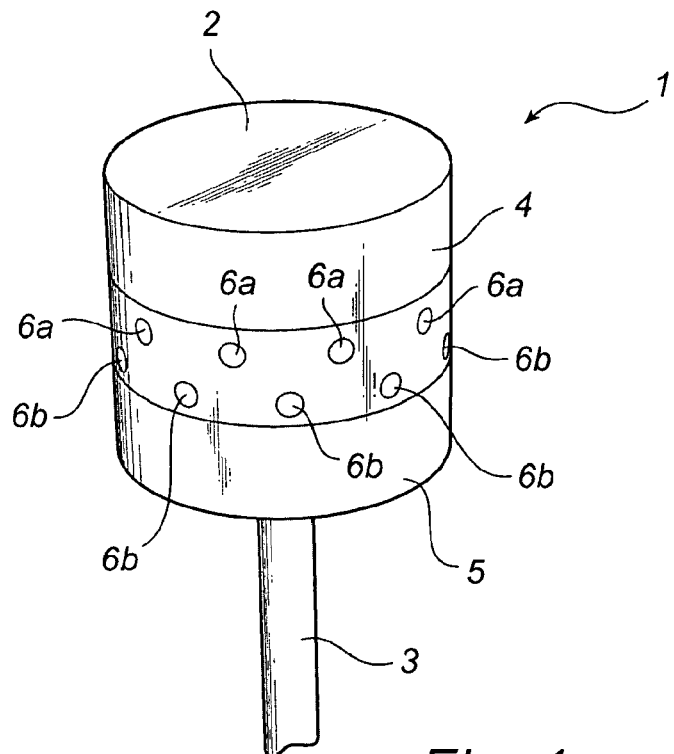
FIG. 1 illustrates an embodiment of a target according to the present invention.

With reference first to FIG. 1, a first embodiment of the reflective target according to the present invention will be described. The reflective target according to the present invention is particularly suitable for use in distance measuring and surveying applications and is adapted for receiving light beams emitted from, for example, a survey device such as a distance measuring instrument and for reflecting it towards the survey instrument. The measurement instrument may be a total station or geodetic instrument. A total station is a distance measuring instrument with an integrated distance and angular measurement, i.e. with combined electronic, optical and computer techniques. Such a total station gives both the distance as well as the vertical and horizontal direction towards an object or a target, whereby the distance is measured against a reflecting surface of the target. Preferably, the total station calculates the position of a target in a fixed ground-based coordinate system. However, as the person skilled within the art easily realizes, it should be noted that the target according to the present invention may be used in connection with other types of distance measuring or tracking instruments where the distance is measured by means of emitted light beams.

As shown in FIG. 1, the reflective target 1 comprises a base element 2 which may be attached to a rod 3. The rod 3 may be mounted on a vehicle such as a ground preparing machine. Alternatively, the base element 2 may be mounted directly on the object, e.g. a vehicle. In this embodiment, the base element 2 has a circular cross-section, i.e. has a circular cross-section in plane being perpendicular to a longitudinal axis of the target 1. However, as the skilled person realizes and as apparent from the detailed description, the are other shapes of the cross section that are conceivable. For example, the cross-section of the target may be octagonal, ellipsoid or may have any other shape being suitable for the intended purpose.

Furthermore, according to this embodiment of the present invention, the reflecting target 1 comprises a first reflective area 4 and a second reflective area 5. In this embodiment, the first and second reflective areas 4 and 5 includes reflective foils attached on the base element 2. The reflecting areas 4 and 5 are circumferentially arranged at the base element 2 such that light beams emitted from the measuring instrument (not shown) being incident in an angular area of substantially 360° degrees in plane are reflected back towards the measuring instrument. Thereby, the reflecting target may function as an all-around reflector. The at least one light reflecting area and the at least one array of light emitting elements are arranged axial symmetrically about a central axis of the base element, the central axis being vertical or longitudinal, i.e. substantially perpendicular in relation to an emitting direction of the light emitted from the light emitting devices, as can be seen in the figures. The central axis is substantially parallel with the rod 3. As can be seen in FIG. 1, a first reflective area 4 is arranged above, in a vertical direction, two arrays of light emitting devices 6a, 6b, and second reflecting area 5 is arranged below the arrays of light emitting devices 6a, 6b in an axially symmetrical way.

Furthermore, the reflecting target 1 comprises an identification unit, which, in this embodiment, comprises an array of light emitting elements adapted to emit light with at least one predetermined wavelength. In another embodiment, the identification unit comprises a RF-unit including a transmitter adapted to transmit RF-signals modulated with a certain frequency, wherein a measuring instrument is capable of determining an identity of the target by means of received RF-signals.

In a preferred embodiment, the light emitting elements are light emitting diodes (LEDs) 6a, 6b adapted to emit infra-red light, for example, at approximately 780 nm. Further, the diodes may be adapted to emit light in, for example, the visible region of the electromagnetic spectrum. The array of light emitting elements 6a, 6b are circumferentially arranged such that light beams can be emitted in an angular area of substantially 360° degrees in plane. Thus, irrespective of the orientation of the target 1, light beams can be emitted from the target 1 and received by the measuring instrument. In this embodiment, the light emitting diodes 6a, 6b are arranged in a first row of diodes 6a and a second row of diodes 6b.

In addition, the target may comprise control circuitry (not shown) for controlling the light emitting elements, and a power source (not shown) for providing power to the control circuitry and to the light emitting elements. The control circuitry may be operative to activate the LEDs.

According to embodiments, the reflecting areas 4 and 5 and the array of light emitting elements 6 are rotational symmetrically and coaxially arranged at the base element 2.

Moreover, the light emitting diodes (LEDs) 6a, 6b emit light with predetermined characteristic allowing the measurement instrument to identify the target 1 before locking and tracking the target 1 by analyzing the characteristic of the received light. In one embodiment, the predetermined characteristic includes that the light emitted from the infrared LEDs 6a, 6b are modulated with a predetermined frequency. This may be controlled by an operator of the target 1, for example, by an operator of a vehicle upon which the target 1 is mounted. Alternatively, activation periods of the light emitting element and/or the modulation may be controlled by the control circuitry.

According to embodiments, more than one frequency may be used, for example, the first row of LEDs 6a may be modulated with a first frequency and the second row of LEDs 6b may be modulated with a second frequency.

In operation, the measuring instrument receives light beams emitted from the LEDs 6a, 6b, modulated with a certain frequency identifying that particular target 1, by a detector. The instrument will reject or accept target 1 depending upon the detected ID. When an accepted target is detected the instrument will lock onto the reflecting area/areas using a locking system. In one embodiment, there are eight different frequencies thus allowing eight different target ID channels. Accordingly, multiple targets can be used simultaneously in the same area or working site without interference. As understood by the skilled person, there may be more or less frequencies than eight thus allowing more than or less than eight different target ID channels.

Figure 2:
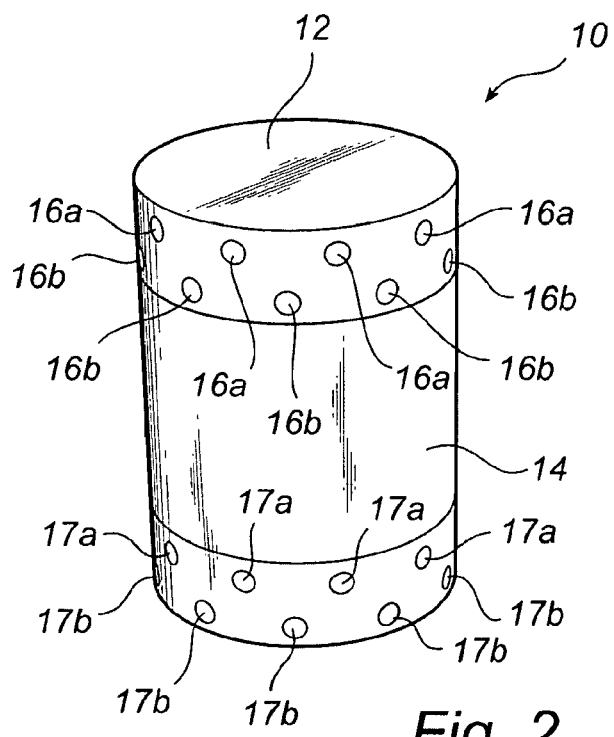
FIG. 2 illustrates another embodiment of a target according to the present invention.

Turning now to FIG. 2, another embodiment of a target according to the present invention will be discussed. The reflective target 10 comprises a base element 12 which may be attached to a rod (not shown). The rod may be mounted on a vehicle such as a ground preparing machine. Alternatively, the base element 12 may be mounted directly on the object, e.g. a vehicle. In this embodiment, the base element 12 has a circular cross-section, i.e. has a circular cross-section in plane being perpendicular to a longitudinal axis of the target 10. However, as the skilled person realizes and as apparent from the detailed description, the are other shapes of the cross section that are conceivable. For example, the cross-section of the target may be octagonal, or ellipsoid or may have any other shape being suitable for the intended purpose.

Furthermore, according to this embodiment of the present invention, the reflecting target 10 comprises a reflective area 14. In this embodiment, the reflective area 14 includes a reflective foil attached on the base element 12. The reflecting area 14 are circumferentially arranged at the base element 12 such that light beams emitted from the measuring instrument (not shown) being incident in an angular area of substantially 360° degrees in plane are reflected back towards the measuring instrument. Thereby, the reflecting target may function as an all-around reflector Moreover, the reflecting target 10 comprises an identification unit, which, in this embodiment, comprises a first and a second array of light emitting elements 16a, 16b and 17a, 17b, respectively, adapted to emit light with at least one predetermined wavelength. In a preferred embodiment, the light emitting elements are light emitting diodes 16a, 16b and 17a, 17b adapted to emit infrared light, for example, at approximately 780 nm. The arrays of light emitting elements 16a, 16b and 17a, 17b are circumferentially arranged such that light beams can be emitted in an angular area of substantially 360° degrees in plane. Thus, irrespective of the orientation of the target 10, light beams can be emitted from the target 10 and received by the measuring instrument. In this embodiment, the first array of LEDs 16a, 16b comprises a first row of LEDs 16a and a second row of LEDs 16b. The second array 17a, 17b comprises a first row of LEDs 17a and a second row of LEDs 17b. According to embodiments, the reflecting area 14 and the arrays of light emitting elements 16a, 16b, 17a, 17b are rotational symmetrically and coaxially arranged at the base element 12.

Further, the light emitting diodes (LEDs) 16a, 16b, 17a, 17b emit light with predetermined characteristic allowing the measurement instrument to identify the target 10 before locking and tracking the target 10 by analyzing the characteristic of the received light. In one embodiment, the predetermined characteristic includes that the light emitted from the infrared LEDs 16a, 16b, 17a, 17b is modulated with a predetermined frequency. This may be controlled by an operator of the target 10, for example, by an operator of a vehicle upon which the target 10 is mounted. In another embodiment, the first row of LEDs 16a, 17a of each array is modulated with a first frequency and the second row of LEDs 16b, 17b of each array is modulated with a second frequency.

In operation, the target according to the second embodiment operates as the target according to the first embodiment.

As can be seen in FIG. 2, a reflective area 14 is arranged, in a vertical direction, between two respective arrays of light emitting devices 16a, 16b, and 17a, 17b ,respectively, in an axially symmetric way.

Figures 3, 4:
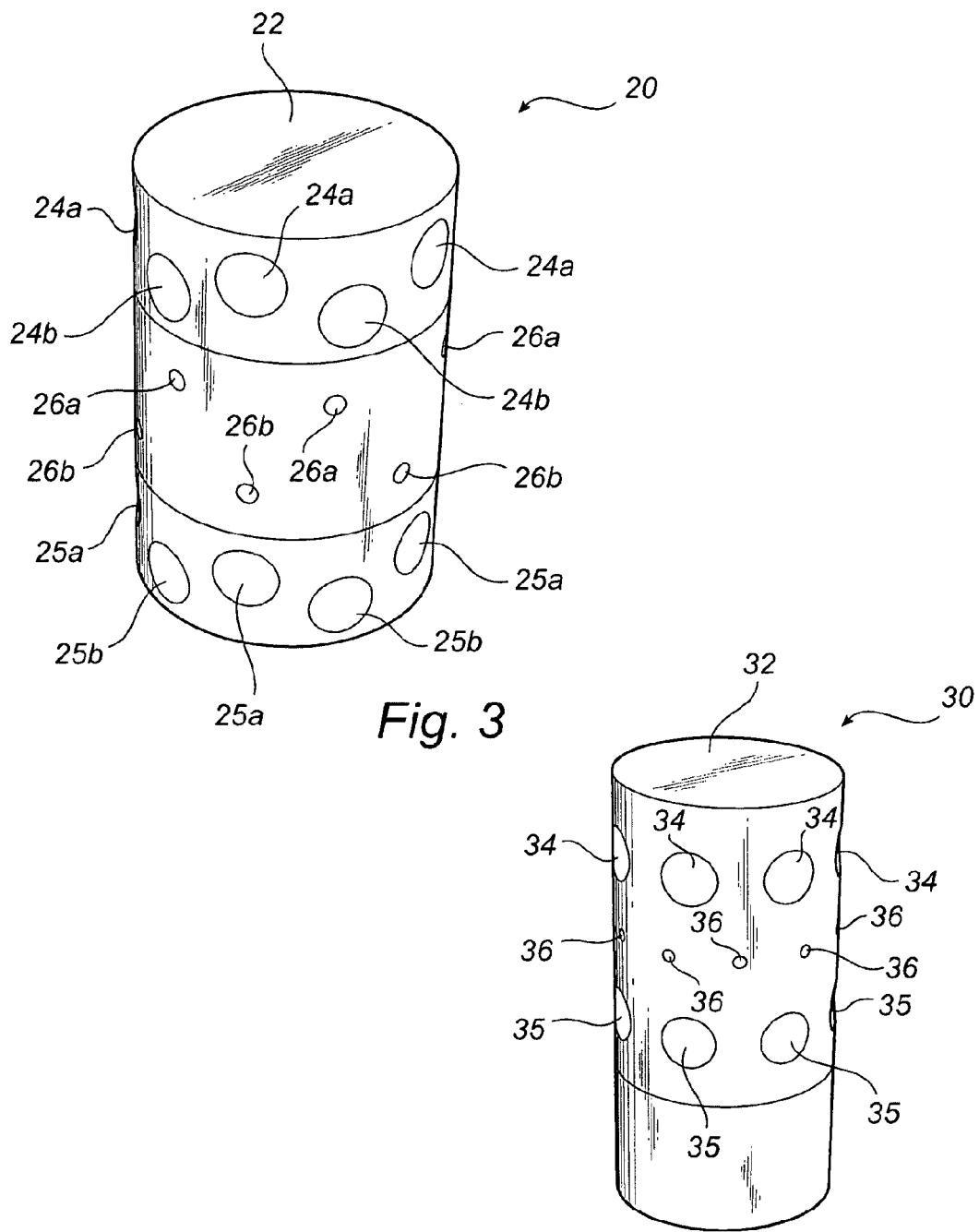
FIG. 3 illustrates a further embodiment of a target according to the present invention.
FIG. 4 illustrates yet another embodiment of a target according to the present invention.

Referring now to FIG. 3, a further embodiment of a target according to the present invention will be discussed. The reflective target 20 comprises a base element 22 which may be attached to a rod (not shown). The rod may be mounted on a vehicle such as a ground preparing machine. Alternatively, the base element 22 may be mounted directly on the object, e.g. a vehicle. In this embodiment, the base element 22 has a circular cross-section, i.e. has a circular cross-section in plane being perpendicular to a longitudinal axis of the target 20. However, as the skilled person realizes and as apparent from the detailed description, the are other shapes of the cross section that are conceivable. For example, the cross-section of the target may be octagonal, or ellipsoid or may have any other shape being suitable for the intended purpose.

Furthermore, according to this embodiment of the present invention, the reflecting target 20 comprises a first array of reflective prisms 24a, 24b including a first row of prisms 24a and a second row of reflective prisms 24b. Further, the reflecting target comprises a second array of reflecting prisms 25a, 25b including a first row of prisms 25a and a second row of reflective prisms 25b. The reflecting prisms 24a, 24b, 25a, 25b are circumferentially arranged at the base element 22 such that light beams emitted from the measuring instrument (not shown) being incident in an angular area of substantially 360° degrees in plane are reflected back towards the measuring instrument. Thereby, the reflecting target may function as an all-around reflector Furthermore, the reflecting target 20 comprises an identification unit, which, in this embodiment, comprises an array of light emitting elements 26a, 26b adapted to emit light at a predetermined wavelength. In a preferred embodiment, the light emitting elements are light emitting diodes 26a, 26b adapted to emit infrared light, for example, at approximately 780 nm. The array of light emitting elements 26a, 26b are circumferentially arranged such that light beams can be emitted in an angular area of substantially 360° degrees in plane. Thus, irrespective of the orientation of the target 20, light beams can be emitted from the target 20 and received by the measuring instrument. In this embodiment, the array of LEDs 26a, 26b comprises a first row of LEDs 26a and a second row of LEDs 26b. According to embodiments, the arrays of reflecting prisms 24a, 24b, 25a, 25b and the array of light emitting elements 26a, 26b are rotational symmetrically and coaxially arranged at the base element 22.

Moreover, the light emitting diodes (LEDs) 26a, 26b, emit light with predetermined characteristic allowing the measurement instrument to identify the target 20 before locking and tracking the target 20 by analyzing the characteristic of the received light. In one embodiment, the predetermined characteristic includes that the light emitted from the infrared LEDs 26a, 26b are modulated with a predetermined frequency. This may be controlled by an operator of the target 20, for example, by an operator of a vehicle upon which the target 20 is mounted. In another embodiment, the first row of LEDs 26a of the array is modulated with a first frequency and the second row of LEDs 26b of the array is modulated with a second frequency.

In operation, the target according to the third embodiment operates as the target according to the first embodiment.

With reference now to FIG. 4, a further embodiment of a target according to the present invention will be discussed. The reflective target 30 comprises a base element 32 which may be mounted on a vehicle such as a ground preparing machine. In this embodiment, the base element 32 has a circular cross-section, i.e. has a circular cross-section in plane being perpendicular to a longitudinal axis of the target 30. However, as the skilled person realizes and as apparent from the detailed description, the are other shapes of the cross section that are conceivable. For example, the cross-section of the target may be octagonal, or ellipsoid or may have any other shape being suitable for the intended purpose.

Furthermore, according to this embodiment of the present invention, the reflecting target 30 comprises a first array of reflective prisms 34. Further, the reflecting target 30 comprises a second array of reflecting prisms 35. The reflecting prisms 34 and 35 are circumferentially arranged at the base element 32 such that light beams emitted from the measuring instrument (not shown) being incident in an angular area of substantially 360° degrees in plane are reflected back towards the measuring instrument. Thereby, the reflecting target may function as an all-around reflector Furthermore, the reflecting target 30 comprises an identification unit, which, in this embodiment, comprises an array of light emitting elements 36 adapted to emit light at a predetermined wavelength. In a preferred embodiment, the light emitting elements are light emitting diodes 36 adapted to emit infrared light, for example, at approximately 780 nm. The array of light emitting elements 36 are circumferentially arranged such that light beams can be emitted in an angular area of substantially 360° degrees in plane. Thus, irrespective of the orientation of the target 30, light beams can be emitted from the target 30 and received by the measuring instrument. Moreover, the light emitting diodes (LEDs) 36 emit light with predetermined characteristic allowing the measurement instrument to identify the target 30 before locking and tracking the target 30 by analyzing the characteristic of the received light. In one embodiment, the predetermined characteristic includes that the light emitted from the infrared LEDs 36 are modulated with a predetermined frequency. This may be controlled by an operator of the target 30, for example, by an operator of a vehicle upon which the target 30 is mounted.

In operation, the target according to the fourth embodiment operates as the target according to the first embodiment.

Figure 5:
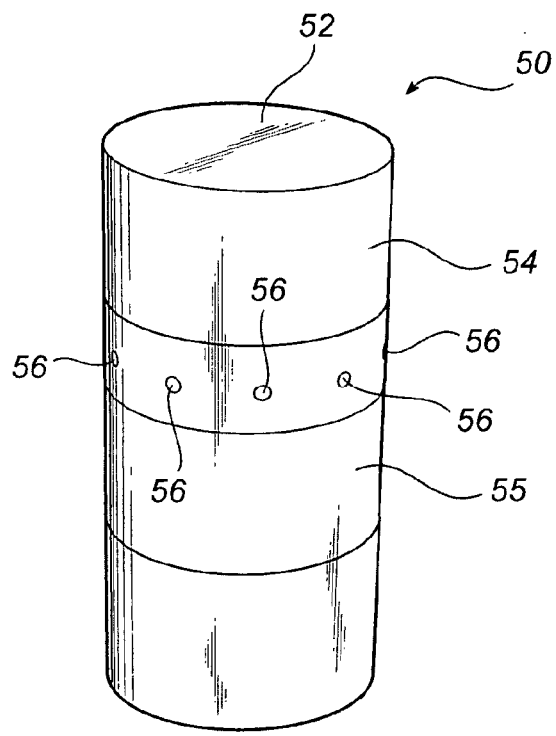
FIG. 5 illustrates still another embodiment of a target according to the present invention.

In FIG. 5, a further embodiment is shown. The target 50 comprises a base element 52, first reflective area including a reflective foil 54 attached on the base element 52, a second reflective area including a reflective foil 55 attached on the base element 52, and an array of light emitting diodes 56. The reflecting areas 54 and 55 and the array of light emitting elements 56 are rotational symmetrically and coaxially arranged at the base element 52. In operation, this embodiment operates as the embodiment of the target described above.

Figure 6:
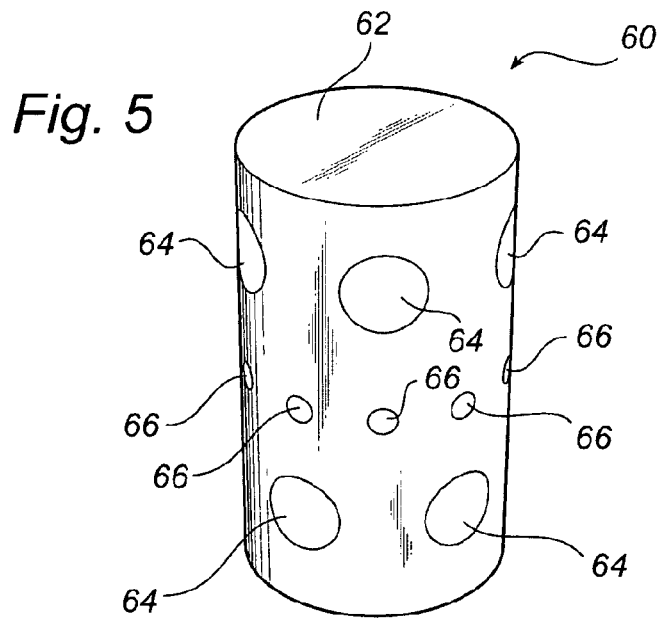
FIG. 6 illustrates a further embodiment of a target according to the present invention.

In FIG. 6 yet another embodiment is shown, the target 60 comprises a base element 62, first reflective area including a first array of reflective prisms 64 attached on the base element 62, a second reflective area including reflective prisms 64 attached on the base element 62, and an array of light emitting diodes 66. The arrays of reflecting prism 64 and the array of light emitting elements 66 are rotational symmetrically and coaxially arranged at the base element 62. In operation, this embodiment operates as the embodiment of the target described above.

As the skilled person realizes, there are a number of conceivable alternative embodiments to the above given embodiments. For example, the characteristics of the light emitting elements may also include different wavelengths, i.e. the light emitting elements may be adapted to emit light with different wavelengths. A particular target may thus be identified by means of frequency modulation and/or wavelength of emitted light. According to a further example, a target may comprise both reflecting prisms and reflecting foil.

Although an exemplary embodiment of the present invention has been shown and described, it will be apparent to those having ordinary skill in the art that a number of changes, modifications, or alterations to the inventions as described herein may be made. Thus, it is to be understood that the above description of the invention and the accompanying drawings is to be regarded as a non-limiting example thereof and that the scope of protection is defined by the appended patent claims.

The invention claimed is:

1. A reflective target, comprising:
    a base element;
    at least one light reflecting area arranged at said base element, said at least one light reflecting area being arranged to reflect light beams being incident in an angular area of substantially 360° degrees in plane; and
    an identification unit, arranged at said base element, and comprising at least one array of light emitting elements the at least one array of light emitting elements being adapted to emit signals having characteristics indicating an identity of said reflective target and to emit a sequence of signals propagating in different directions, wherein a rotational position of said reflective target relative to a surveying apparatus is determinable based on respective amplitudes of said sequence of signals and, wherein said at least one light reflecting area and said at least one array of light emitting elements are axial symmetrically arranged about a central axis of said base element.

2. The reflective target according to claim 1, comprising either:
    at least two arrays of light emitting elements and one light reflecting area arranged axial symmetrically at said base element; or
    at least two arrays of light emitting elements and two light reflecting areas axial symmetrically arranged at said base element.

3. The reflective target according to claim 1, wherein said at least one reflecting area and said at least one array of light emitting elements are circumferentially and rotational symmetrically arranged at said base element.

4. The reflective target according to claim 1, wherein said at least one array of light emitting elements are circumferentially arranged such that light beams are emittable in an angular area of substantially 360° degrees in plane.

5. The reflective target according to claim 1, wherein said at least one light reflecting area and said at least one array of light emitting elements are coaxially arranged at said base element.

6. The reflective target according to claim 1, wherein said characteristics of said signals includes a modulation of the signals with a frequency.

7. The reflective target according to claim 1, wherein said at least one array of light emitting elements includes light emitting diodes.

8. The reflective target according to claim 1, wherein said at least one light reflecting area comprises a reflective foil.

9. The reflective target according to claim 1, wherein said at least one light reflecting area comprises at least one array of reflecting prisms.

10. The reflective target according to claim 1, wherein said reflective target is used with a measuring instrument.

11. A measuring and surveying system including at least one reflective target according to claim 1 and at least one measuring instrument, said at least one measuring instrument being adapted to emit light beams, to receive reflected light from said reflective target, to detect signals emitted from the reflective target having characteristics identifying said reflective target, and to determine an identity of said reflective target by using said characteristics.

12. A method for determining an identify of a target in a measuring and surveying system including at least one measuring instrument and at least one target, said target comprising: a base element; at least one light reflecting area arranged at said base element, said at least one light reflecting area being arranged to reflect light beams being incident in an angular area of substantially 360° degrees in plane; and an identification unit arranged at said base element, said method comprising:
    emitting signals having characteristics indicating an identity of said target from said identification unit;
    emitting a sequence of signals propagating in different directions;
    receiving said emitted signals at said at least one measuring unit;
    determining an identity of said target in said at least one measuring device using said characteristics of said received signals; and
    determining a rotational position of said target relative to a measuring device based on respective amplitudes of said sequence of signals.

13. The method according to claim 12, wherein said emitting signals having characteristics comprises:
    modulating the signals with a frequency.

14. The reflective target according to claim 2, wherein said at least one reflecting area and said at least one array of light emitting elements are circumferentially and rotational symmetrically arranged at said base element.

15. The reflective target according to claim 2, wherein said at least one array of light emitting elements are circumferentially arranged such that light beams are emittable in an angular area of substantially 360° degrees in plane.

16. The reflective target according to claim 2, wherein said at least one light reflecting area and said at least one array of light emitting elements are coaxially arranged at said base element.

17. The reflective target according to claim 2, wherein said characteristics of said signals includes a modulation of the signals with a frequency.

18. The reflective target according to claim 2, wherein said at least one array of light emitting elements includes light emitting diodes.

* * * * *